(12) United States Patent
Stewart, II

(10) Patent No.: US 6,993,938 B2
(45) Date of Patent: Feb. 7, 2006

(54) SYSTEMS AND DEVICES FOR FUSING AND FRACTURING FIBER OPTIC CABLES

(75) Inventor: William L. Stewart, II, Benbrook, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 205 days.

(21) Appl. No.: 10/685,035

(22) Filed: Oct. 14, 2003

(65) Prior Publication Data

US 2005/0076679 A1   Apr. 14, 2005

(51) Int. Cl.
*G02B 6/255* (2006.01)

(52) U.S. Cl. .......................... 65/501; 65/406; 65/407; 385/96; 385/98

(58) Field of Classification Search ................ 65/501, 65/433

See application file for complete search history.

(56) References Cited

U.S. PATENT DOCUMENTS

| | | | |
|---|---|---|---|
| 6,769,823 B2 | 8/2004 | Morita et al. | |
| 2001/0053268 A1 | 12/2001 | Takahashi et al. | |
| 2002/0031323 A1 * | 3/2002 | Hattori et al. | 385/137 |
| 2002/0067893 A1 | 6/2002 | Uken | |
| 2002/0176673 A1 * | 11/2002 | Kasuu et al. | 385/96 |
| 2004/0031173 A1 | 2/2004 | Kobayashi et al. | |

FOREIGN PATENT DOCUMENTS

| | | |
|---|---|---|
| DE | 41 02 459 A1 | 7/1992 |
| EP | 0 211 221 A1 | 2/1987 |
| EP | 0 528 636 A1 | 2/1993 |
| EP | 1 260 840 A2 | 11/2002 |
| GB | 2 118 319 A | 10/1983 |

* cited by examiner

*Primary Examiner*—Dionne A. Walls
*Assistant Examiner*—Lisa L. Herring
(74) *Attorney, Agent, or Firm*—Kilpatrick Stockton LLP

(57) ABSTRACT

Systems, devices and methods for compiling and fracturing optical fibers are disclosed. In one aspect, a device is disclosed for coupling and for fracturing optical fibers, comprising a housing for receiving a first end of a first optical fiber and a second end of a second optical fiber, a moveable member capable of moving with respect to the housing, a first electrode coupled to the moveable member and having a first electrode surface, a second electrode connected to the housing and having a second electrode surface, the first and second electrodes being positioned so that the first and second ends of the first and second optical fibers, respectively, are located adjacent to each other and between the first and second electrode surfaces of the first and second electrodes, the first and second electrodes are capable of receiving an electrical signal and passing a current through the first and second ends of the first and second optical fibers, the current fusing the first and second ends of the first and second optical fibers together to form a single optical fiber, and a cutting surface positioned such that upon movement of the moveable member, the single fiber is cut to form the first and second optical fibers having the first and second ends, respectively.

14 Claims, 5 Drawing Sheets

SYSTEMS AND DEVICES FOR FUSING AND FRACTURING FIBER OPTIC CABLES

FIELD OF THE INVENTION

The invention relates to systems, devices, and methods for connecting and disconnecting optical links and, more particularly, to systems, devices, and methods for fusing optical fibers to make connections and for fracturing the optical fibers to disconnect.

BACKGROUND

Optical systems have many advantages over systems that transmit electrical signals. For one, electrical signals are susceptible to electromagnetic noise whereby great care must be taken to shield those signals from sources of electromagnetic radiation. On the other hand, optical signals are immune to electromagnetic radiation and do not require shielding during transmission. Additionally, electrical signals can be transmitted for only relatively small distances since they incur losses proportional to the distance. Optical signals, on the other hand, can be transmitted for great distances with little or no loss. For these and other reasons, many systems incorporate optical signals.

Many optical systems employ optical fibers as the medium for carrying the optical signals. In general, the optical fibers are comprised of an optical core through which the optical signals pass and an outer cladding having a different index of refraction so as to restrict the path of the optical signals to within the core. Optical fiber cables additionally have some sheathing and/or cables running along the length of the cable in order to provide some structural rigidity and to minimize damage to the fiber itself Typically, to join two fibers together, each fiber is separated from the rest of the cable and is terminated in a connector. The fiber ends need to be prepared before being joined with the connector, such as by polishing, convexing, and/or angle cutting. The connector may have a ferrule with an angled surface which aligns itself with the angled surface of the ferrule for a mating connector.

A challenge with these connectors is that they must be precisely aligned and in direct contact with each other to minimize signal loss. The contact points between the connectors, however, may receive dirt, oil, and/or other contaminants that can degrade the connection to the point of being unusable. Furthermore, in addition to contaminants degrading the performance of the connection, vibration, jarring, or other movement of the connectors may cause them to no longer be precisely aligned with each other. If the connectors are not aligned, the connection allows the loss of photonic signals due to misdirection of the signals through the connector ends and due to refraction of the signals.

SUMMARY

The invention addresses the problems above by providing systems, methods, and devices for fusing and fracturing optical fibers. One aspect of an embodiment of the present invention comprises a device for coupling and for fracturing optical fibers, comprising a housing for receiving a first end of a first optical fiber and a second end of a second optical fiber, a moveable member capable of moving with respect to the housing, a first electrode coupled to the moveable member and having a first electrode surface, a second electrode connected to the housing and having a second electrode surface, the first and second electrodes being positioned so that the first and second ends of the first and second optical fibers, respectively, are located adjacent to each other and between the first and second electrode surfaces of the first and second electrodes, the first and second electrodes are capable of receiving an electrical signal and passing a current through the first and second ends of the first and second optical fibers, the current fusing the first and second ends of the first and second optical fibers together to form a single optical fiber, and a cutting surface positioned such that upon movement of the moveable member, the single fiber is cut to form the first and second optical fibers having the first and second ends, respectively.

Rather than using connectors, the systems, methods, and devices according to the invention provide a higher performance connection between two fiber ends. Because the fiber ends are fused together, debris and other contaminants can not position themselves along the signal path which would result in the loss of signal. By fusing the ends of two fibers together, the single fiber thus formed is not as susceptible to movement and is thus not prone to any misalignment errors as is the case with the use of connectors. In addition to fusing two fiber ends together the device also offers a convenient way to separate a fiber into two different fiber strands. The device therefore enables a fiber to be fractured to facilitate removal of one or more of the fibers.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Reference will now be made in detail to preferred embodiments of the invention, non-limiting examples of which are illustrated in the accompanying drawings.

Figure 1:
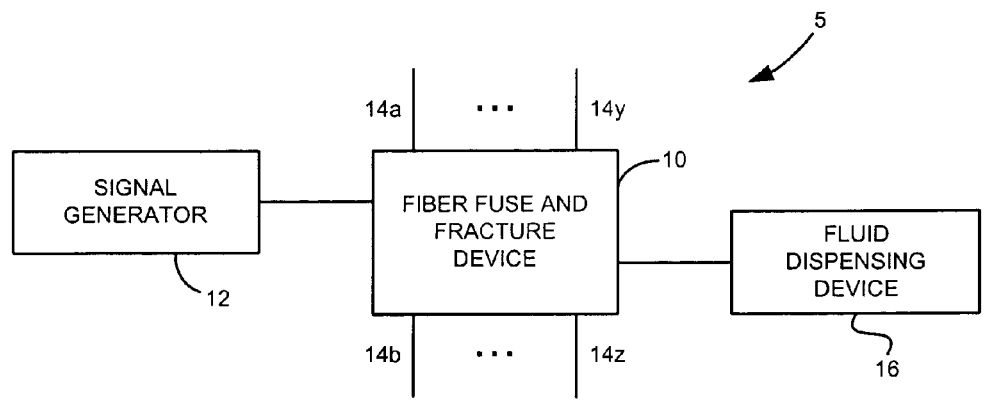
FIG. 1 is a block diagram of one embodiment of a system for fusing and fracturing optical fibers.

With reference to FIG. 1, a system 5 for fusing and fracturing optical fibers includes a fiber fuse and fracture device 10, a signal generator 12, and a fluid dispensing device 16. The fiber fuse and fracture device 10, which will hereinafter be referred to as simply the device 10, receives ends of at least two fibers. In the example shown, the device 10 receives multiple pairs of fibers 14a and 14b to 14y and 14z. One skilled in the art would appreciate that the device 10 can receive any number of pairs of fibers, including a single pair of fibers.

Within the device 10, the ends of the fibers 14 are placed adjacent to each other and are placed in between a pair of electrodes. The electrodes can be, for example, an anode and a cathode. The signal generator 12 provides the electrodes with an electrical signal that causes a current to pass through the fiber ends. In one embodiment, the signal generator is a DC device, but can be an AC device. The current caused by the signal generator melts the fiber ends and fuses them together to form a single optical fiber. One of the electrodes is preferably mounted to a housing while the other electrode is coupled to a moveable member. The device can include a cutting member for cutting a fiber when the moveable member is moved from a first position to a second position. A device according to one embodiment of the invention offers the ability of both fusing optical fibers together as well as fracturing a fiber into two separate fibers.

In the embodiment shown, the system also includes a fluid dispensing device 16 for delivering a fluid or a gas during or after fusing the ends of two or more optical fibers. The fluid or gas may be a fluid or gas that assists in removing contaminants and other debris while the current passes through the fiber ends, may be a fluid or gas that assists in the fusing of the optical fiber ends, or may be a fluid or gas that provides an outer cladding to the optical fiber.

Figure 2:
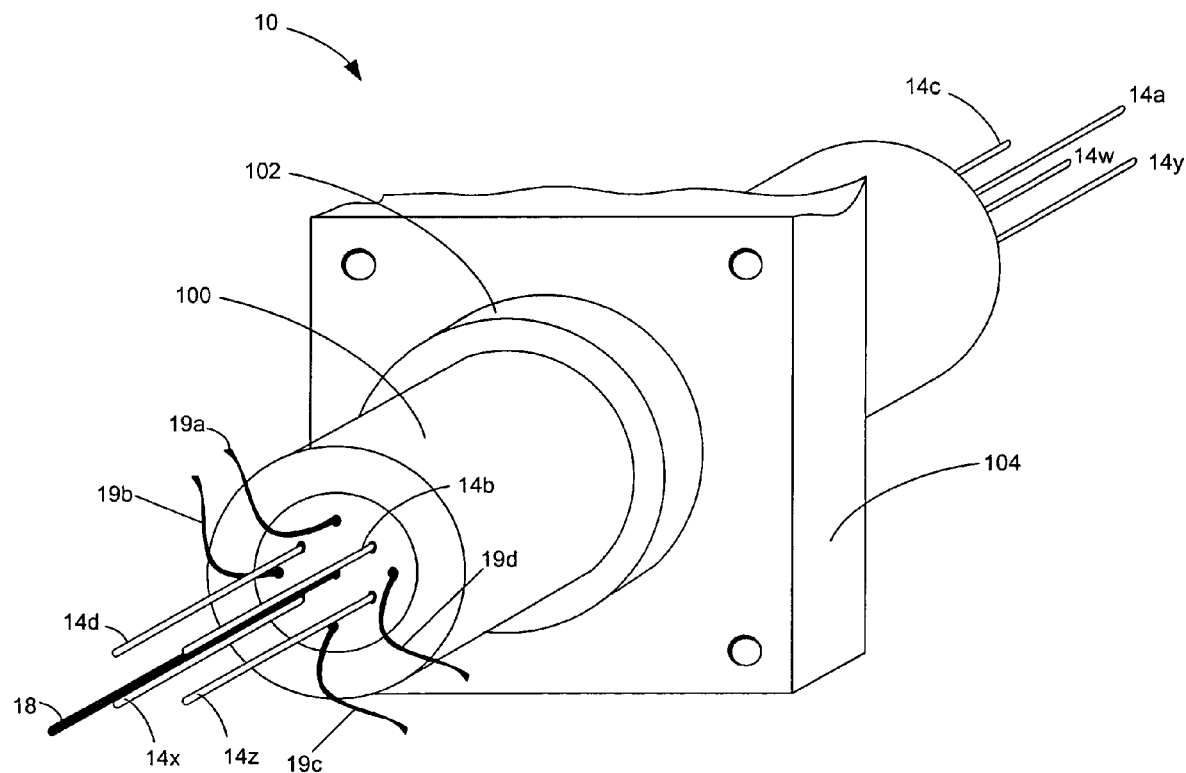
FIG. 2 is a perspective diagram of one embodiment of a device for fusing and fracturing fibers for use with the system of FIG. 1.
Figure 3:
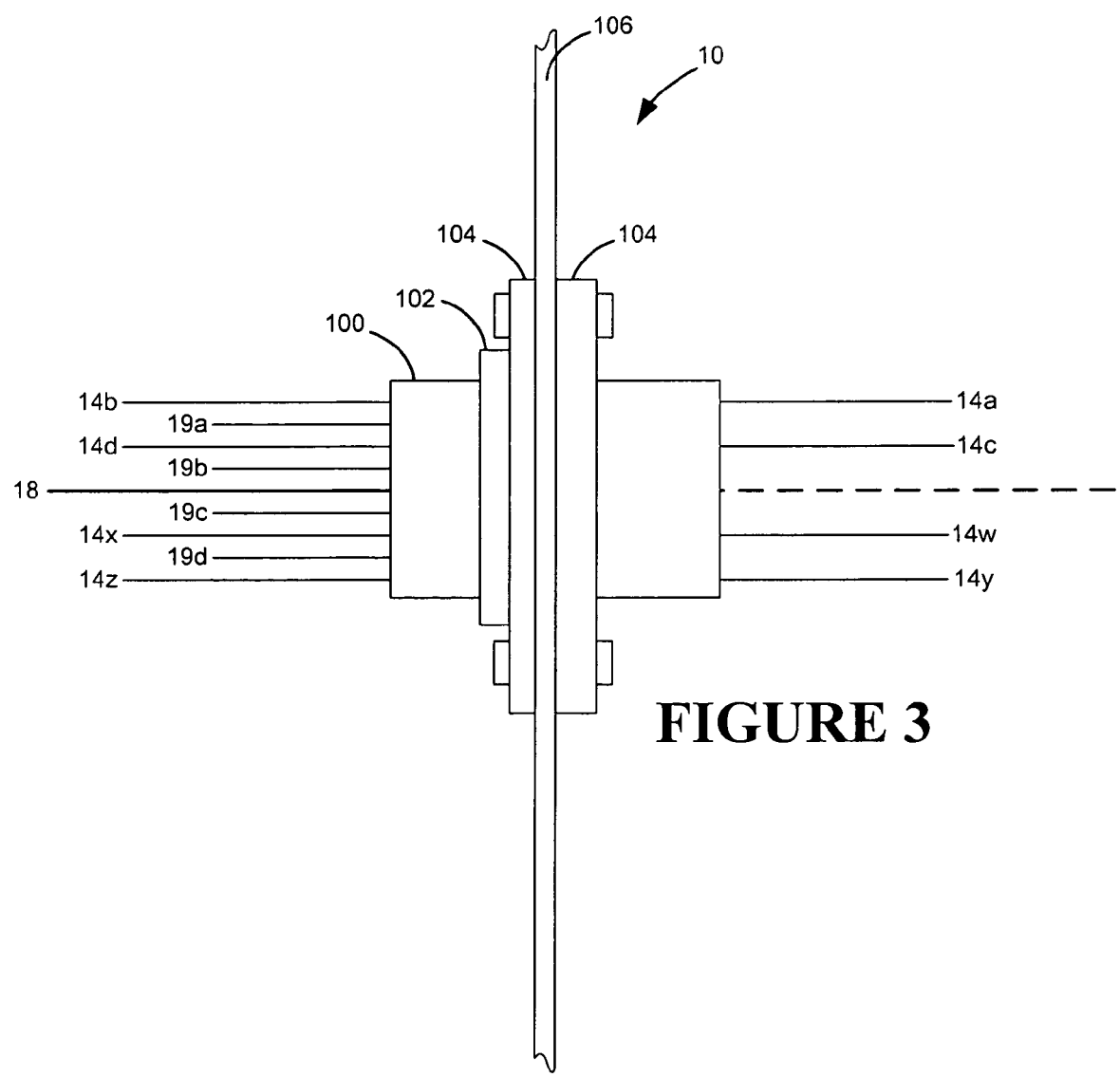
FIG. 3 is a side view of the device of FIG. 2.

FIG. 2 illustrates one embodiment of the device 10. The device 10 contains a housing 100. In this embodiment, the housing 100 is cylindrical. Fibers 14a, 14c, 14w, and 14y are received in one end of the housing 100 and fibers 14b, 14d, 14x, and 14z are received at the other end of housing 100. The ends of fibers 14a, 14b, 14c, 14d, 14w, 14x, and 14y, 14z are aligned in a fuser and cutter assembly 102. Signal wires 19a–d and ground wire 18 can be connected to the signal generator 12 to provide an electrical signal to the electrodes. In one embodiment, the wires 18 and 19 are copper wires. The housing 100 can include a port extending to the ends of the optical fibers 14 for directing fluid or gas from the fluid dispensing device 16 to the ends of the optical fibers 14. The embodiment shown includes a mounting bracket 104. The mounting bracket 104 can be used to mount the device 10 to a wall structure. FIG. 3 illustrates one embodiment of a side view of the device 10 mounted with the mounting bracket 104 to a wall structure 106. In another embodiment, the device 10 can be an in-line coupler and does not include a mounting bracket 104.

Figure 4A:
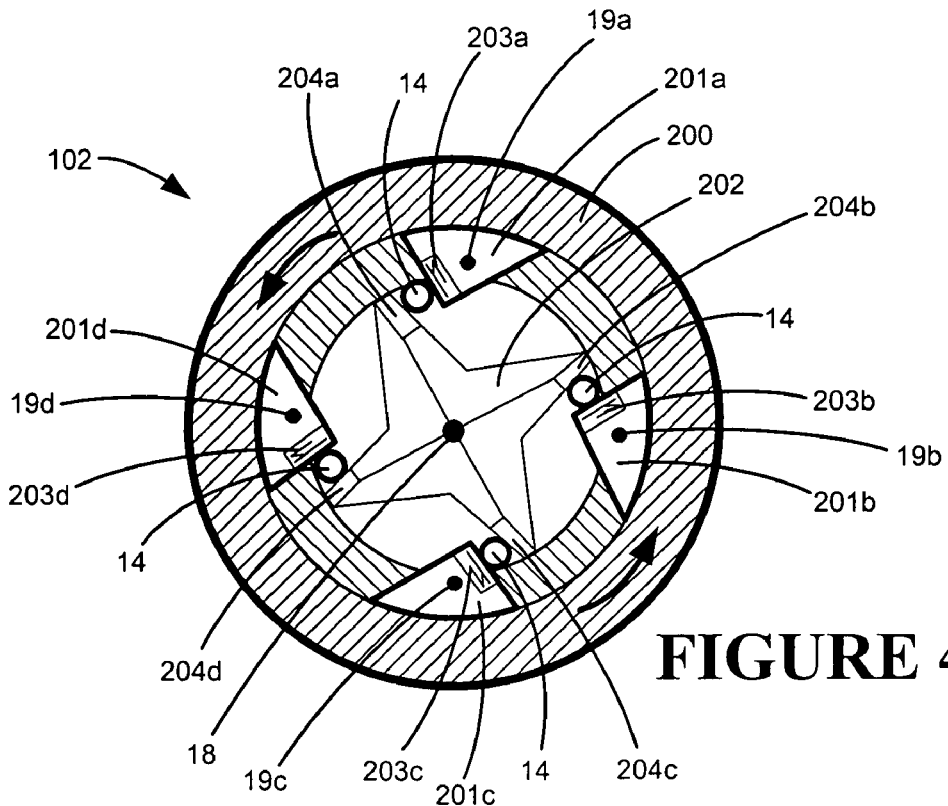
FIG. 4(A) is a cut-away view of the device of FIG. 2 with a moveable member in a first position.
Figure 4B:
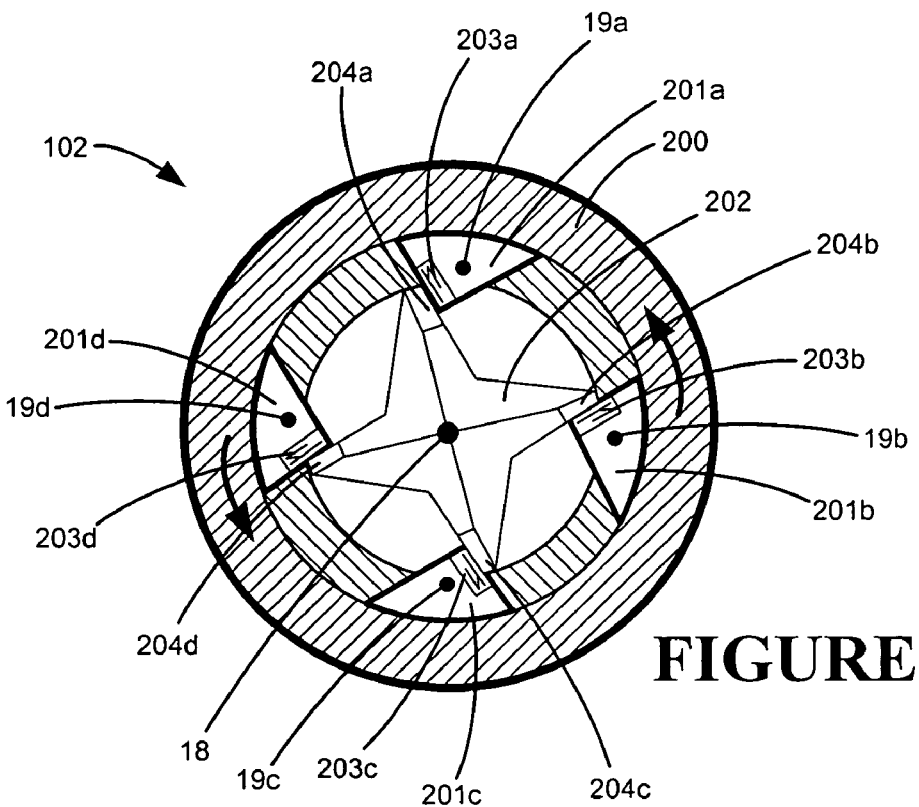
FIG. 4(B) is a cut-away view of a device of FIG. 2 with the moveable member in a second position.

FIGS. 4(A) and 4(B) illustrate an embodiment of a cut-away view of the fuser and cutter assembly 102. The assembly 102 comprises an outer movable member 200 and an inner electrode member 202. The outer moveable member 200 can comprise a conductive material and can be moveable with respect to the inner electrode member 202. The inner electrode member can be coupled to or part of the housing 100. The outer movable member 200 includes first electrodes 201a–d with first electrode surfaces 203a–d. The electrode member 202 comprises second electrode surfaces 204a–d. The electrode surfaces 203a–d, 204a–d can be about three to five times the diameter of the fiber. The assembly 102 receives fiber pairs 14 positioned in between electrode surfaces 203a–d and 204a–d. In one embodiment, first electrode surfaces 203a–d are positive and second electrode surfaces 204a–d are negative. When fibers pairs 14 are positioned in between electrodes 203a–d and 204a–d as shown in FIG. 4(A), the signal generator 12 can provide the electrodes with an electrical signal through signal wires 19a–d that causes current to pass through the fiber ends. This current melts the fiber ends and fuses them together to form a single optical fiber.

A cutting surface can be provided on either the first electrode surfaces 203a–d or the second electrode surfaces 204a–d or both so that when movable member 200 rotates from a first position as shown in FIG. 4(A) to a second position as shown in FIG. 4(B), the fiber ends 14 are severed. In one embodiment, this severing is performed by rotating the movable member 200 with respect to the housing 100 and first electrode member 202 in the direction shown in the arrows in FIG. 4(A), which is a counterclockwise direction. Alternatively, the assembly 102 could be configured so to move in a clockwise direction to perform the severing function.

In the embodiment shown, the cutting surface is on the first electrode surface 203a–d. In this embodiment, the first electrode surface can act as a cleaver and the second electrode surface 204a–d can act as an anvil, such that when the first electrode surface 203a–d moves toward the second electrode surface 204a–d the fiber is cut. Alternatively, the first electrode 201a–d and second electrode 202 may both contain cutting surfaces that can come together during the movement of the first electrode 201a–d to the second electrode and cut the fiber. The cut caused by the cutting surface or surfaces can be flush or can be at an angle so that the cutting surface is not the same as the electrode surface, which makes contact with the fiber.

Figure 5:
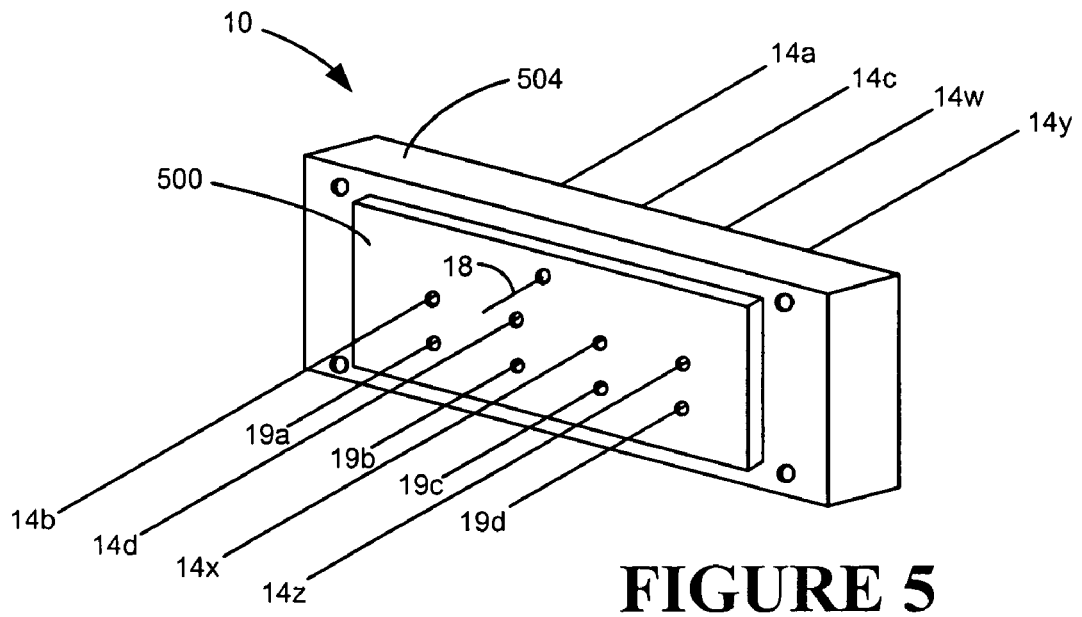
FIG. 5 is a perspective diagram of another embodiment of a device for fusing and fracturing fiber for use with the system of FIG. 1.

FIG. 5 illustrates an alternative embodiment of the device 10. In this embodiment, the device 10 has a rectangular housing 500. The fuser and cutter assembly 502 (not shown in FIG. 5) can be internal to housing 500 and include ground wire 18 and signal wires 19a–d. The ends of fibers 14a, 14c, 14w, and 14y meet the respective ends of fibers 14b, 14d, 14x, and 14z in the fuser and cutter assembly. The housing 500 can include a port extending to the ends of the fibers 14 for directing fluid or gas from the fluid dispensing device 16 to the ends of the fibers 14. In one embodiment, the housing 500 can be coupled to a mounting bracket 504.

Figure 6A:
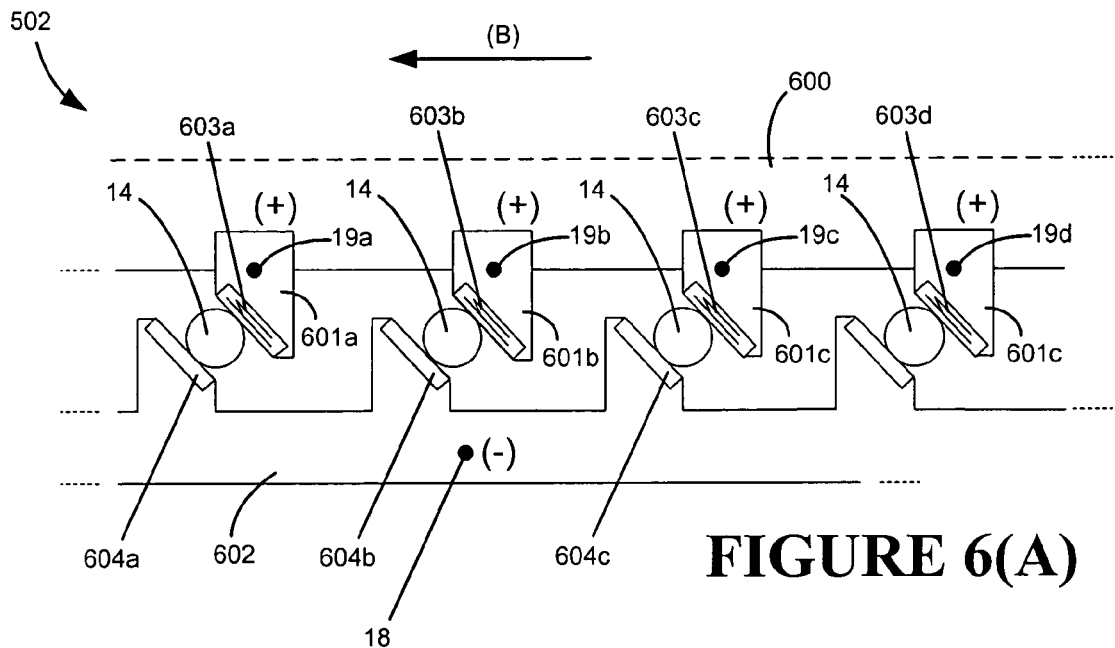
FIG. 6(A) is a cut-away view of the device of FIG. 5 with a moveable member in a first position.
Figure 6B:
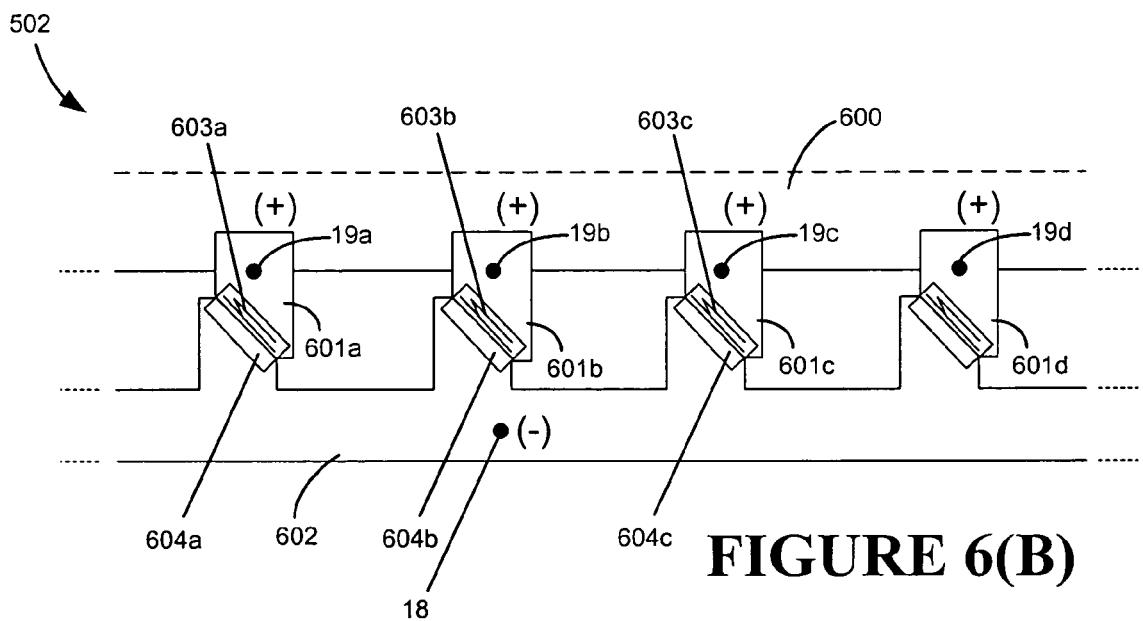
FIG. 6(B) is a cut-away view of the device of FIG. 5 with the moveable member in a second position.

FIGS. 6(A) and 6(B) illustrate a cut-away view of the fuser and cutter assembly 502 of the embodiment shown in FIG. 5. The assembly 502 includes a moveable member 600 and a lower electrode member 602. The moveable member 600 can move with respect to the housing 500 and the lower electrode member 602 can be coupled to or part of the housing 500. The moveable member 600 can comprise a conductive material. The moveable member 600 includes first electrodes 601a–d with first electrode surfaces 603a–d. The lower electrode member 602 includes second electrode surfaces 604a–d. The ends of fibers 14 are positioned in assembly 502 such that they meet in between electrodes 603a–d and 604a–d. The signal generator 12 can provide the electrodes with an electrical signal that causes current to pass through the fiber ends. This current melts the fiber ends and fuses them together to form a single optical fiber. In one embodiment, the first electrodes 601 are positive electrodes and the second electrode 602 is a negative electrode. A cutting surface is placed on electrode surfaces 603a–d or 604a–d or on both, so that when movable member moves in the direction indicated by arrow B the fiber 14 is severed into two fibers. The cutting surface can cause a flush cut or a slanted cut through the fiber. The movable member can move in a linear motion, for example, from a first position shown FIG. 6(A) to a second position shown in FIG. 6(B).

Figure 7:
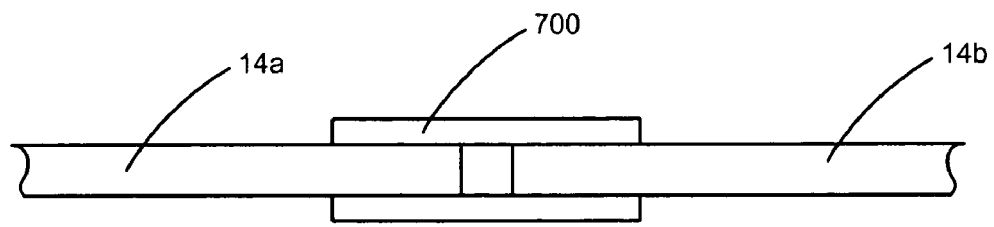
FIG. 7 is a cut-away view of a sheath for use in one embodiment of the invention.

In one embodiment, the fiber ends can be positioned in a sleeve, which is placed between the electrode surfaces. FIG. 7 illustrates a cut away view of two fiber ends 14a and 14b in a sleeve 700. The sleeve 700 can be a glass sleeve and can help to ensure that the fused glass caused by a current running in between the electrodes extends to include both fiber ends.

The foregoing description of the preferred embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated.

What we claim:

1. A device for coupling and for fracturing optical fibers, comprising:
    a housing for receiving a first end of a first optical fiber and a second end of a second optical fiber;
    a moveable member capable of moving with respect to the housing;
    a first electrode coupled to the moveable member and having a first electrode surface;
    a second electrode connected to the housing and having a second electrode surface;
    the first and second electrodes being positioned so that the first and second ends of the first and second optical fibers, respectively, are located adjacent to each other and between the first and second electrode surfaces of the first and second electrodes;
    the first and second electrodes are capable of receiving an electrical signal and passing a current through the first and second ends of the first and second optical fibers;
    the current fusing the first and second ends of the first and second optical fibers together to form a single optical fiber; and
    a cutting surface positioned such that upon movement of the moveable member, the single fiber is cut to form the first and second optical fibers having the first and second ends, respectively.

2. The device as set forth in claim 1, wherein the fist electrode is an anode and the second electrode is a cathode.

3. The device as set forth in claim 1, wherein the cutting surface is positioned on the first electrode surface, the second electrode surface, or both.

4. The device as set forth in claim 1, wherein the moveable member moves in a circular motion.

5. The device as set forth in claim 1, wherein the moveable member moves in a linear motion.

6. The device as set forth in claim 1, wherein the moveable member is comprised of a conductive material.

7. The device as set forth in claim 1, wherein the housing includes a port extending to the first and second ends of the first and second optical fibers for directing a fluid or gas to the first and second ends of the first and second optical fibers.

8. The device as set forth in claim 1, further comprising a fluid dispensing device for delivering a fluid or gas to the port.

9. The device as set forth in claim 1, further comprising a signal generator for providing the electrical signal to the first and second electrodes.

10. The device as set forth in claim 1, wherein the housing is for receiving a plurality of optical fibers each having an end, the first and second electrodes positioned adjacent to the ends of multiple pairs of optical fibers, and the first and second electrodes for fusing the pairs of optical fibers to form single fibers.

11. The device as set forth in claim 1, further comprising a sleeve for receiving the first and second ends of the first and second optical fibers, wherein the sleeve is positioned between the first and second electrodes.

12. A system for coupling and fracturing optical fibers, comprising:
    a housing for receiving a first end of a first optical fiber and a second end of a second optical fiber;
    a moveable member capable of moving with respect to the housing;
    a first electrode coupled to the moveable member and having a first electrode surface;
    a second electrode connected to the housing and having a second electrode surface;
    the first and second electrodes being positioned so that the first and second ends of the first and second optical fibers, respectively, are located adjacent to each other and between the first and second electrode surfaces of the first and second electrodes;
    the first and second electrodes are capable of receiving an electrical signal and passing a current through the first and second ends of the first and second optical fibers;
    the current fusing the first and second ends of the first and second optical fibers together to form a single optical fiber;
    a cutting surface positioned such that upon movement of the moveable member, the single fiber is cut to form the first and second optical fibers having the first and second ends, respectively;
    a fluid dispensing device for delivering a fluid or gas to the first and second ends of the first and second optical fibers; and
    a signal generator for providing an electrical signal to the first and second electrodes.

13. The system as set forth in claim 12, further comprising a sleeve for receiving the first and second ends of the first and second optical fibers, wherein the sleeve is positioned between the first and second electrodes.

14. The system as set forth in claim 12, wherein the housing is for receiving a plurality of optical fibers each having an end, the first and second electrodes positioned adjacent to the ends of multiple pairs of optical fibers, and the first and second electrodes for fusing the pairs of optical fibers to form single fibers.

* * * * *